United States Patent [19]

Oshikawa

[11] 4,063,695
[45] Dec. 20, 1977

[54] SEAT BELT RETRACTOR
[75] Inventor: Kiyomitsu Oshikawa, Kariya, Japan
[73] Assignee: Nippondenso Co., Ltd., Kariya, Japan
[21] Appl. No.: 679,496
[22] Filed: Apr. 22, 1976
[30] Foreign Application Priority Data
  Apr. 30, 1975  Japan .................................. 50-52715
[51] Int. Cl.² ...................... A62B 35/02; B65H 75/48
[52] U.S. Cl. .............................. 242/107.4 A; 280/744
[58] Field of Search ................. 242/107.4 R, 107.4 E;
                       280/744–747; 297/385–389
[56] References Cited
  U.S. PATENT DOCUMENTS
  3,237,729  3/1966  Proctor ............................ 242/99 X
  3,868,068  2/1975  Heath ........................... 242/107.4 A
  3,901,461  8/1975  Stephenson et al. ......... 242/107.4 A
  3,923,269  12/1975  Kell ............................. 242/107.4 A Primary Examiner—Stanley N. Gilreath
Assistant Examiner—John M. Jillions
Attorney, Agent, or Firm—Cushman, Darby & Cushman

[57] ABSTRACT

A seat belt retractor angularly and displaceably secured to the floor pan of a motor vehicle so as to ensure a smooth belt extending operation and also prevent wear on the side edges of the belt. A mechanical inertia locking device is provided with the seat belt retractor, which locking device is required to be normally held in its horizontal position to ensure satisfactory locking operation upon the sudden deceleration of the vehicle. For the purpose, a quadric crank chain or a gear train is linked with the inertia locking device in order to hole it horizontally regardless of the angular movement of the seat belt retractor.

6 Claims, 6 Drawing Figures

SEAT BELT RETRACTOR

BACKGROUND OF THE INVENTION

1. Field of the Invention

The present invention relates to an improvement of a seat belt retractor and more particularly to a seat belt retractor of the type which includes inertia locking means for preventing a belt from further unwinding movement when the sudden deceleration of the vehicle occurs so that the belt holds a driver from being thrown forwards.

2. Description of Prior Art

A conventional seat belt retractor of this type has a frame which is fixedly secured to a floor pan of a motor vehicle. A reel rotatably received in the frame does not move so as to suitably extend a belt therefrom responding to changes of belt extending directions, that is a shaft for the reel is always held horizontally. However, the belt extending direction is generally inclined by a certain angle with respect to a transverse direction of the reel, causing wear of the belt at its side edges. Thus smooth belt extending operation may not be achieved.

SUMMARY OF THE INVENTION

It is, therefore, an object of the present invention to provide an improved seat belt retractor which is simple and low in cost.

It is another object of the present invention to provide a seat belt retractor to ensure a smooth belt extending operation.

It is a further object of the present invention to provide a seat belt retractor, wherein a reel of a frame is able to move in response to the belt extending direction so that the belt extending direction is kept transverse to a longitudinal direction of the reel.

It is a still further object of the present invention to provide a seat belt retractor, in which inertia locking means can properly operate even though the reel is moved with respect to the belt extending direction.

This and other objects of the present invention will be readily apparent from the following specification and drawings.

DETAILED DESCRIPTION OF THE PRIFERRED EMBODIMENT

Figure 1:
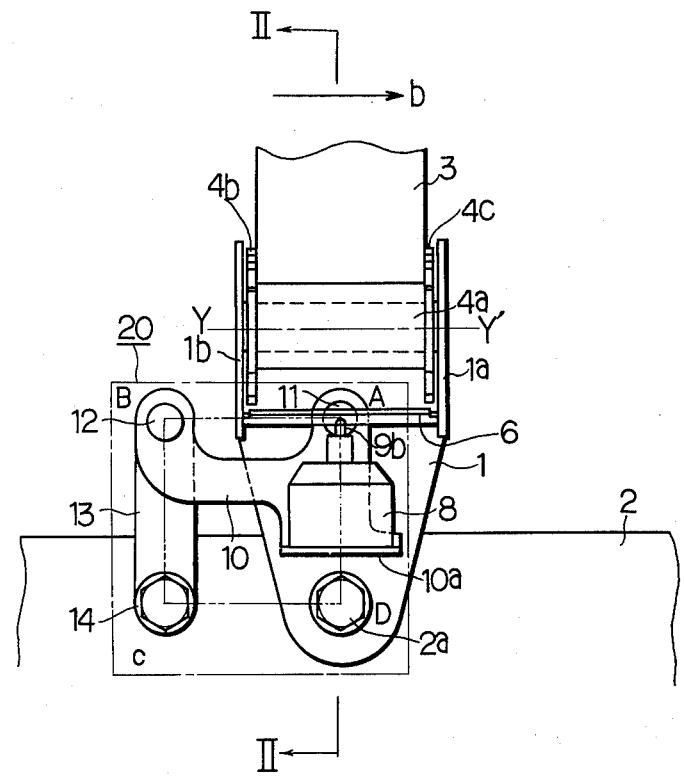
FIG. 1 is a plan view showing a seat belt retractor according to the present invention.

Referring now particularly to FIGS. 1, 2, 3 and 4 of the drawings, a generally U-shaped support or frame includes a base wall 1 bolted to a floor pan 2 of a motor vehicle by means of a bolt 2a and a nut 2b. The frame is pivotally fixed to the floor pan at the bolt 2a as described more in detail hereinafter. The spaced generally parallel side walls 1a and 1b of the frame extend normal to the base wall 1 and each is provided with supporting holes.

A reel 4 includes a shaft 4a and a pair of toothed end plates or ratchet plates 4b and 4c fixedly secured to the shaft 4a. The ends of the shaft 4a extend beyond the ratchet plates 4b and 4c and are freely rotatably received within the respective supporting holes of the side walls 1a and 1b.

Figure 2:
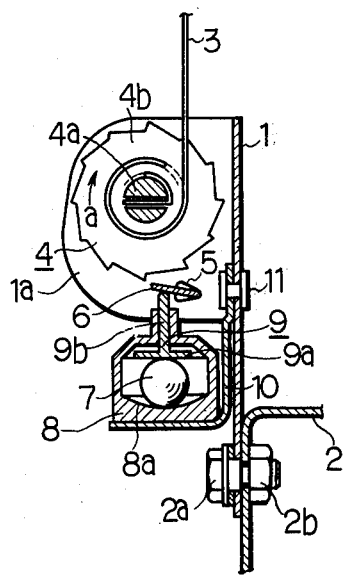
FIG. 2 is a sectional side view taken along a line II—II in FIG. 1.
Figure 3:
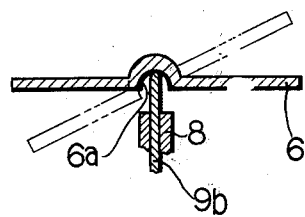
FIG. 3 is an enlarged sectional view showing a locking lever used in the seat belt retractor in FIG. 1.

A circular housing (not shown) in conventionally mounted on one side wall 1a and houses a coil spring, not shown, having one end thereof anchored to the housing and the other end thereof suitably anchored to one end of the shaft 4a to continually bias the reel 4 in a belt retracting direction or clockwise as viewed in FIG. 2, which is indicated by an arrow a.

A belt 3 has its inner end fixed to a slot on the shaft 4a as shown in FIG. 2, and its outer end provided with a tongue plate (not shown) for an engagement with a conventional push button buckle.

Fan-shaped openings 5 are oppositely formed at the respective side walls 1a and 1b, within which both axial ends of a locking lever 6 are freely received so that the locking lever 6 is pivotally actuated upwards and downwards by a locking lever actuating device 9 described lator.

When the side end of the locking lever 6 is so displaced upwardly to move into engagement with the ratchet plates 4b and 4c, any further counter clockwise rotation of the reel 4 or movement of the reel in a belt extending direction is blocked.

Inertia locking means comprises a casing 8 which is firmly secured to a base 10a of a supporting arm 10. A wide angled conically-surfaced support 8a or a generally spherically-surfaced support is formed at the inside of the base of the casing 8. An inertia member 7 of the inertia locking means in the form of a ball rests on the support 8a and normally at the central portion thereof. To give it sufficient mass for it to perform satisfactorily, the ball is made of metal, but it may be made of other material, for example hard synthetic resin, in which case it may be weighted by encasing a metal mass in the resin.

The locking lever actuating device 9 includes a circular plate 9a resting on the top of the inertia member 7 and a rod 9b coupled to said circular plate 9a and slidably mounted in the casing 8. The locking lever actuating device 9 thus has straight line reciprocating movement in response to the movement of the inertia member 7, and would be coupled to the locking lever 6 with its upward movement to lift-it up.

The under surface of the locking lever 6 rests on the top end of the rod 9b. In the illustrated embodiment of FIG. 3, a semispherical concavity 6a is formed at the locking lever to ensure the satisfactory abutment between the locking lever 6 and the rod 9b even when the abutting angle of the rod changes with respect to the locking lever, as indicated by a two-dot-chain line in FIG. 3.

The supporting arm 10 is pivotally bolted to the frame at 11 and likewise pivotally linked with a lever 13 and 12.

The lever 13 is in turn pivotally bolted to the floor pan 2 at 14.

Thus, respective pivotally bolted centers A, B, C and D constitute a parallelogram, wherein each length of the respective opposing sides is the same with each other (AB=CD and BC=AD). In other words, the floor pan 2, the base wall 1 of the frame, the supporting arm 10 and the lever 13 are respectively pivotally linked to form a quadric crank chain 20 disposed normal to the horizontal plane, thus to normally hold the supporting arm in a horizontal position.

Figure 4:
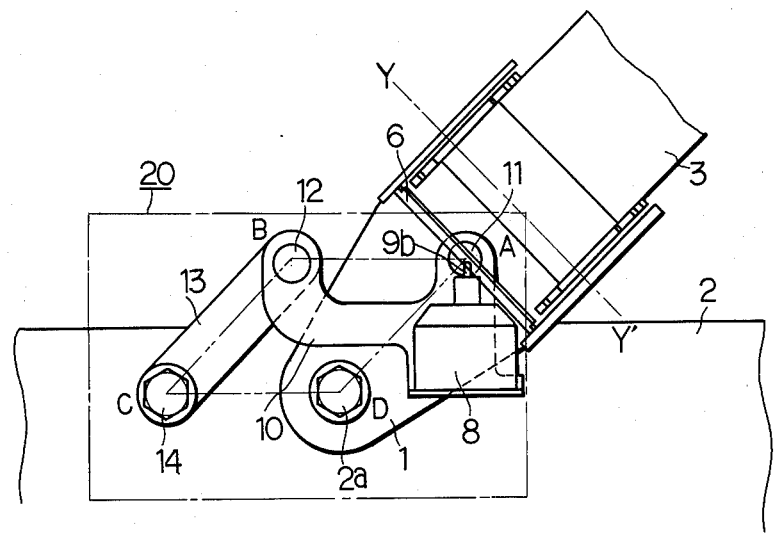
FIG. 4 is a plan view showing the seat belt retractor with a frame thereof being inclined in response to the belt extending direction.

In operation, the frame is pivotally bolted to the floor pan 2 at 2a so that it moves along with a belt extending direction, namely the frame is pivotted so as to arrange a longitudinal direction Y-Y' of the reel shaft 4a perpendicular to the belt extending direction as shown in FIG. 4. Accordingly, a smooth belt extending movement can be carried out in any belt extending directions, whereby wear on the side edges of the belt 3 can be prevented.

On the other hand, the quadric crank chain 20 moves to place the supporting arm 10 in the horizontal position as shown in FIG. 4, whereby the inertia member 7 is at its normal position of rest at the bottom of the conically-surfaced support 8a and the plate 9a resting on the top of the ball 7 is held at its lowest position. Accordingly, no locking action takes place in the inertia locking means with this belt extending operation, causing no clocking action on the extending belt 3.

Should the motor vehicle in which the inertia locking means described above is mounted be subjected to sudden deceleration such as might arise in the event of a collosion or change in direction of movement, the inertia member 7 will move from the bottom of the spherically-surfaced support 8a and roll up the inclined circular surface thereof, the inertia member moving in a direction opposite to that of the vehicle, i.e., if the vehicle decelerates the inertia member 7 will move in a direction towards the front of the vehicle. The inertia locking means is thus omni-directional and when the inertia member 7 rolls up the inclined circular surface of the sphericallysurfaced support 8a, it lifts the plate 9a and the rod 9b so that the locking lever 6 moves into engagement with the ratchet plates 4b and 4c. Consequently, any further rotation of the reel 4 in a belt extending direction is blocked so that the driver is safely fastened in his seat free from danger.

Figure 5:
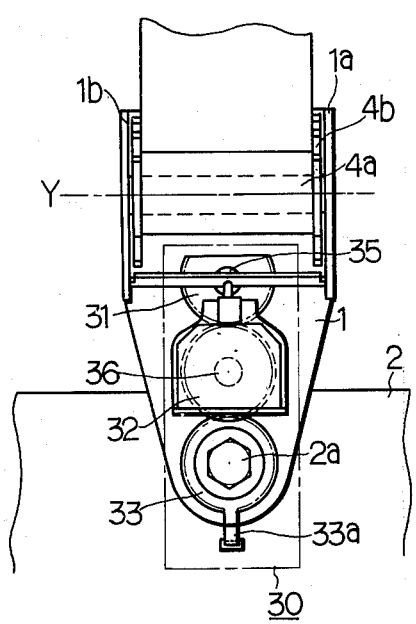
FIG. 5 is a plan view of a seat belt retractor showing another embodiment of the present invention.
Figure 6:
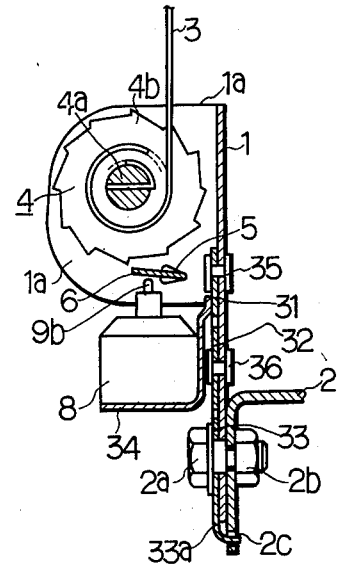
FIG. 6 is a sectional side view taken along a line VI—VI in FIG. 5.

Referring next to FIGS. 5 and 6 showing a second embodiment of the present invention, in which previously used reference numerals indicate the same parts, a gear train 30 is employed in place of the quadric crank chain 20 for normally placing the inertia locking means in its horizontal position regardless of the angular displacement of the frame. The gear train 30 includes a first gear 31 of semicircular shape rotatably rivetted to the base wall 1 at 35. A supporting plate 34 is fixedly secured to the first gear 31, on which the inertia locking means is fixedly mounted to be held horizontally. A second gear 32 is likewise rotatably rivetted to the base wall 1 at 36 meshing with the first gear 31 as well as a third gear 33 with a pitch diameter the same as that of the first gear 31. The third gear 33 is pivotally bolted to the floor pan 2 by means of the bolt 2a and the nut 2b, with a pawl 33a of the third gear 33 being inserted into a locking hole 2c of the floor pan 2, whereby the third gear 33 moves relative to the angular displacement of the frame but does not move relative to the floor pan 2.

In operation with the second embodiment as described above, when the frame is angularly displaced to ensure the smooth belt extending operation, with the longitudinal direction Y-Y' of the reel shaft 4a being placed perpendicular to the belt extending direction, the inertia locking means is so moved to be horizontally held in response to the angular displacement.

The above operation will be described more in detail. The second gear 32 rotates by a certain angle in response to the angular displacement of the frame because of the engagement with the third gear 33, so that the first gear 31 is thereby driven to rotate in the same direction of the frame by the same angle corresponding to that of the angular displacement of the frame, to thereby hold the locking means horizontally in any angular displacements.

Thus, the inertia locking means satisfactorily operates upon sudden deceleration or change in direction of movement in the same manner as described in the first embodiment.

The present invention is not to be limited to the above embodiments, so that the inertia locking means may be of the type comprising an inertia pendulum for detecting the deceleration subjected to the motor vehicle.

A chain or a belt may be employed in place of the second gear of the gear train in the second embodiment.

What is claimed is:

1. A seat belt retractor for a motor vehicle comprising;
   a frame including a base pivotally secured with respect to the floor of a motor vehicle
   a reel having at least one ratchet plate and a shaft mounting said plate and rotatably received by said frame;
   a belt looped over said reel shaft and having one end fixed to said reel;
   means for mounting said frame and reel so that said frame pivots to maintain said reel shaft perpendicular to the direction in which said belt is extended;
   a locking lever pivotally supported by said frame for engagement with said ratchet plate to block further rotation of said reel in a belt extending direction;
   inertia means, operatively coupled to said locking lever, for driving said locking lever into engagement with said ratchet plate when decleeration of said motor vehicle exceeds a predetermined value; and
   linkage means connecting said inertia means and said floor for maintaining said inertia means parallel to said floor regardless of the angular displacement of said frame.

2. A seat belt retractor as set forth in claim 1, wherein said inertia means includes:
   a casing having a support with an inclined surface inside said casing;
   an inertia member resting on said support; and
   a locking lever actuating device having a circular plate resting on the top of said inertia member and a rod slidably mounted in said casing, one end of said rod being connected to said circular plate, said locking lever resting on the top of the other end of said rod, to thereby actuate said locking lever to move into engagement with said ratchet plate to block any further rotation of said reel in the belt extending direction.

3. A seat belt retractor as set forth in claim 1, wherein said linkage means includes:
   a supporting arm pivotally coupled at its one end to said base, said inertia means being fixedly mounted on said supporting arm; and
   a lever pivotally secured at its one end to said floor, the other end thereof being pivotally linked with the other end of said supporting arm;
   said floor, said base, said supporting arm and said lever constituting a quadric crank chain, wherein the respective pivotally coupled centers constitute a parallelogram, whereby said supporting arm places said inertia means parallel to said floor regardless of the angular movement of said frame.

4. A seat belt retractor as set forth in claim 1, wherein said linkage means includes:
a first gear rotatably secured to said base, said locking means being fixedly secured to said first gear;
a second gear rotatably secured to said base and meshing with said first gear; and
a third gear rotatably secured to said floor together with said base and meshing with said second gear, the pitch diameter of said third gear being the same as that of said first gear,
said third gear being fitted to said floor enabling said base to move freely and angularly relative to said third gear 5. A seat belt retractor for a vehicle comprising:
a frame including a base wall pivotally secured to a portion of a vehicle and spaced parallel side walls integrally formed on and extending normal to said base wall;
a reel having a pair of ratchet plates and a shaft rotatably received by said parallel side walls;
a belt looped over said reel and having one end fixed to said reel;
a locking lever pivotally supported by said parallel side walls and operatively forced into engagement with said ratchet plates to block further rotation of said reel in a belt extending direction;
inertia locking means operatively coupled to said locking lever for detecting the deceleration of said vehicle and driving said locking lever into engagement with said ratchet plates when the deceleration of said vehicle exceeds a predetermined value;
a supporting arm pivotally coupled at its one end to said base wall, said inertia locking means being fixedly secured to said supporting arm; and
a lever pivotally secured at its one end to said portion of said vehicle, the other end thereof being pivotally linked with the other end of said supporting arm,
the length between pivotally coupled centers on said base wall being the same as that on said lever, and the length between pivotally coupled centers on said supporting arm being the same as that on said portion of said vehicle for constituting a quadric crank chain of a parallelogram with said base wall, said supporting arm, said lever and said portion of said vehicle,
whereby said inertia locking means is held parallel to the vehicle floor by the operation of said quadric crank chain regardless of the angular movement of said frame.

6. A seat belt retractor for a vehicle comprising;
a frame including a base wall pivotally secured to a portion of a vehicle and spaced parallel side walls integrally formed on and extending normal to said base wall;
a reel having a pair of ratchet plates and a shaft rotatably received by said parallel side walls;
a belt looped over said reel and having one end fixed to said reel;
a locking lever pivotally supported by said parallel side walls and operatively forced into engagement with said ratchet plates to block further rotation of said reel in a belt extending direction;
inertia locking means operatively coupled to said locking lever for detecting the deceleration of said vehicle and driving said locking lever into engagement with said ratchet plates when the deceleration of said vehicle exceeds a predetermined value;
a first gear rotatably secured to said base wall, said inertia locking means is fixedly secured to said first gear;
a second gear rotatably secured to said base wall and meshing with said first gear; and
a third gear pivotally secured to said portion of said vehicle together with said base wall and meshing with said second gear, the pitch diameter being the same as that of said first gear,
said third gear being fitted to said portion of said vehicle for restraining the movement of said third gear relative to said portion of said vehicle and for enabling said base wall to move angularly relative to said third gear upon the angular movement of said frame,
whereby said inertia locking means is parallel to the vehicle floor held by the operation of said first, second and third gears regardless of said angular movement of said frame.

* * * * *